3,314,927
COPOLYMERS OF ALKYLENE POLYAMINE-SUBSTITUTED ALKYL VINYL ETHERS AND THIOETHERS
Everett J. Kelley, Moorestown, N.J., assignor to Rohm & Haas Company, Philadelphia, Pa., a corporation of Delaware
No Drawing. Filed July 21, 1964, Ser. No. 384,240
4 Claims. (Cl. 260—79.7)

This invention relates to alkylene polyamine-substituted alkyl vinyl ether (including thioether) copolymers that are useful as coating, impregnating, and adhesive compositions. It is particularly concerned with copolymers of this type which are characterized by outstanding adhesion toward various substrates such as glass, metals, and plastics.

The invention is concerned, in its preferred embodiments, with copolymers of about ½ to 20% by weight of a polyamide of the formula

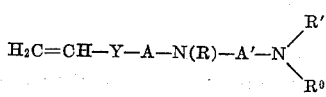

wherein
Y is selected from the group consisting of O and S,
A is an alkylene group having 2 to 4 carbon atoms,
A' is an alkylene group having 2 to 3 carbon atoms,
R is selected from the group consisting of H and $(C_1$—$C_4)$-alkyl, and
R' and R⁰ are individually selected from the group consisting of H and $(C_1$—$C_6)$-alkyl, at least one other monomer selected from the group consisting of esters of acrylic acid and methacrylic acid with a $(C_1$—$C_{18})$-alcohol selected from the group consisting of saturated aliphatic, saturated alicyclic, and aralkyl alcohols, vinyl esters of a saturated $(C_1$—$C_4)$-aliphatic carboxylic acid, and vinylaromatic hydrocarbons, 0 to 70% by weight of at least one compound selected from the group consisting of acrylonitrile, methacrylonitrile, vinyl chloride, and vinylidene chloride, 0 to 10% by weight of at least one other monomer having a polar group selected from the group consisting of amine, amide, and hydroxyl groups, and 0 to 2% by weight of an $\alpha,\beta$-monoethylenically unsaturated carboxylic acid.

A typical embodiment of the substituted vinyl ether monomer forming a component of the copolymers of the present invention is N-vinyloxyethyl-ethylenediamine and the following discussion for simplicity refers either to a polyamine-substituted alkyl vinyl ether as a generic definition or to this specific monomer as a typical representative thereof. Copolymers containing from ½ to 20% by weight of the polyamine-substituted alkyl vinyl ether and such neutral monomers as esters of acrylic acid or methacrylic acid and a saturated aliphatic, alicyclic, or aryl-substituted aliphatic alcohol having from 1 to 18 carbon atoms, vinyl esters such as vinyl acetate, vinyl propionate, or vinyl butyrate, or vinyl aromatic hydrocarbons, such as styrene and the various vinyl-toluenes, provide the most important embodiments of the present invention. However, in some specific embodiments the copolymer may contain besides the vinyl ether and one or more of the neutral monomers mentioned up to 70% by weight of one or more monomers selected from vinyl chloride, vinylidene chloride, acrylonitrile, or methacrylonitrile. In other embodiments the copolymer may contain the vinyl ether, neutral monomer as specified, one or more of the last-mentioned group of monomers and up to 10% by weight of one or more monomers containing a polar group of neutral or basic character. Examples of these monomers include acrylamide, methacrylamide, N-methylol acrylamide, N-methylol methacrylamide, N-methyl acrylamide, N-methoxymethyl acrylamide, N-butoxymethyl methacrylamide; vinylpyridines such as 2-vinylpyridine, 4-vinyl pyridine, 2-methyl-5-vinylpyridine; hydroxyl-containing compounds such as hydroxyethyl vinyl sufide, hydroxyethyl vinyl ether, and other hydroxyalkyl vinyl ethers (including the thioethers), hydroxyalkyl acrylates or methacrylates in which the alkyl group contains 2 to 4 carbon atoms such as $\beta$-hydroxyethyl acrylate and $\beta$-hydroxypropyl methacrylate, N-hydroxyalkyl acrylamides such as N-$\beta$-hydroxyethyl methacrylamide and the like. In addition, the copolymer may contain a small amount up to 2% by weight of an $\alpha,\beta$-monoethylenically unsaturated carboxylic acid such as acrylic acid, methacrylic acid, itaconic acid, aconitic acid, citraconic acid, $\alpha$-methacryloxyacetic acid, crotonic acid, maleic acid, and fumaric acid. Preferably the amount of any acid constituent is correlated with the total amount of amine-containing monomer so that gelation by virtue of crosslinking caused by reaction of the acid and amine groups does not occur.

The copolymers may be prepared in conventional fashion by solution, emulsion, suspension, or precipitation techniques by the employment of conventional addition polymerization initiators such as those free-radical catalysts in the category of peroxides and hydroperoxides as well as persulfates and the azo catalysts.

To assist those skilled in the art to practice the present invention, the following modes of operation are suggested by way of illustration, the temperatures being centigrade, the parts and percentages being by weight unless otherwise indicated.

(1) Toluene (233 gms.) is charged to a polymerization flask equipped with a stirrer, a reflux condenser, a thermometer, and dropping funnel. The solvent is stirred and heated to 110° C. A monomer-catalyst solution is made by mixing N-butyl methacrylate (203.7 gms.), methyl methacrylate (135.8 gms.), N-vinyloxyethyl-ethylenediamine (10.5 gms.) and azobisisobutyronitrile (1.25 gms.). This solution is added to the hot toluene at an even rate over a period of two hours while the batch temperature is kept at 110–115 C. A catalyst solution (2.27 gms. of azobisisobutyronitrile in 53 gms. of toluene) is added in three equal portions 2, 3, and 4 hours after the addition of the monomer mixture is completed. The mixture is then heated an additional 2 hours, cooled, and diluted with toluene (187 gms.). The final 40% solids solution containing a copolymer of about 58.2% butylmethacrylate, 38.8% methyl methacrylate, and 3% of N-vinyloxyethyl-ethylenediamine has a Brookfield viscosity of about 200 cps. at 25° C.

(2) The 40% copolymer solution in toluene obtained in (1) is coated on glass, and after air drying is baked for 30 minutes at 150°. Excellent adhesion of the coating is obtained.

(3) The 40% copolymer solution of (1) is coated on an alkyd-primed steel panel (the primer being a commercially-available primer based on Duraplex C–57). After air-drying, the coated panel is heated for 1 hour to about 93° C. Excellent adhesion of the coating is obtained.

(4) The 40% copolymer solution obtained in (1) is similarly applied to bare cold-rolled steel, aluminum, and other panels with the obtaining of adherent, flexible, protective films thereon after baking as before.

(5) An aqueous emulsion copolymer dispersion is prepared in the following manner. To a 1-liter, 3 necked, round-bottom flask fitted with a reflux condenser, thermometer, Teflon blade agitator and nitrogen inlet, is charged water (580 gms.), t-octylphenoxypoly(40)ethoxyethanol (17.1 gms. of 70% solution), ethyl acrylate (132 gms.) methyl methacrylate (64 gms.), and N-vinyloxyethyl-ethylenediamine (4 gms.) in that order. The system is swept with nitrogen and the temperature adjusted to 15° C. with an ice bath. Polymerization is initiated by the addition of freshly prepared solutions of ammonium persulfate (0.2 gm. in 10 mls. water), sodium hydrosulfite (0.2 gm. in 10 mls. water), and ferrous sulfate (2.0 mls. of 0.1% solution of FeSO₄·7H₂O) in the given sequence. The polymerization raises the temperature to 55–60° C. within a few minutes. When the batch temperature drops 10° C. (air-cooling only), an ice bath is applied and the dispersion cooled to room temperature. Dispersion solids following polymerization is approximately 25%. This dispersion of an emulsion copolymer of about 66% ethyl acrylate, 32% methyl methacrylate, and 2% N-(β-vinyloxyethyl)-ethylenediamine is concentrated by evaporation at room temperature to a solids content of 48%. The pH is adjusted to 9.7 with ammonium hydroxide.

(6) The emulsion polymer obtained in (5) is coated on an alkyd-primed steel panel and baked at 100° for one hour. The protective film obtained adheres well not only in dry condition but even after soaking in water for a period of one hour.

(7) Protective coatings may be applied to other surfaces such as on panels of glass, cold-rolled steel, wood, masonry, and asbestos cement shingles by the application of the emulsion copolymer, if desired after pigmenting in conventional fashion, and optionally curing the coated substrates by heating to 150° C. for ½ hour after air-drying.

Instead of the N-vinyloxyethyl-ethylenediamine used in the embodiments mentioned hereinabove for making the copolymers, any one or more monomers of Formula I following may be used instead:

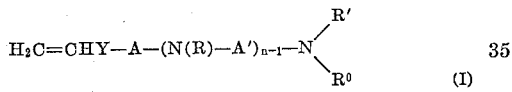
(I)

wherein

Y is selected from the group consisting of O and S,
A is an alkylene group having 2 to 4 carbon atoms,
A' is an alkylene group having 2 to 3 carbon atoms, both A and A' having at least 2 carbon atoms in a chain between N atoms and N and Y atoms,
R is selected from the group consisting of H and $(C_1$—$C_4)$-alkyl,
n is an integer having a value of 1 to 5, preferably 1 to 2,
R' and R⁰ are (1) separate groups individually selected from the group consisting of H, $(C_1$—$C_6)$-alkyl, cyclohexyl, benzyl, phenyl, and (2) composite groups selected from the group consisting of the morpholino residue, —C₂H₄OC₂H₄—, the piperidino residue, —(CH₂)₅—, and the pyrrolidino residue —(CH₂)₄—.

For example, the vinylthioethyl-ethylenediamine may be employed with similar results. The copolymers can also be employed for laminating two or more sheets or films, such as two panels of metals and especially alkyd-primed metals. The copolymers can be employed for the production of insulating coatings for electric conductors such as copper wires, and for this purpose an emulsion copolymer of about 70% acrylonitrile, 2% of N-(β-vinyloxypropyl)propylenediamine, 4% of acrylamide, and 24% of butyl acrylate may be applied, air dried and then baked at 150° C. for 30 minutes.

The copolymers are also useful for shrinkproofing wool and for the bonding of non-woven fabrics. For example, the copolymer of 2% of N-vinyloxyalkyl-N-methyl-N',N'-dimethyl-ethylenediamine, 3% of N-methylol acrylamide, and 95% of ethyl acrylate prepared by emulsion polymerization in the form of a 45% aqueous dispersion may be applied to a 3-ply carded viscose fiber web having a total weight of 2½ ounces per square yard, air dried and heated to 70° C. for 20 minutes in order to provide a wash-resistant and dry-cleaning solvent resistant bonded fabric.

The compounds of Formula I are generally known and are obtained by the vinylation of a compound of Formula II following:

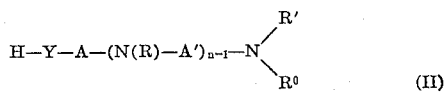
(II)

by procedures disclosed in Br. 838,020 or 839,561 involving reaction with acetylene under pressure at elevated temperatures in the presence of an alkaline catalyst.

The compounds of Formula II are also generally known. One way of making them is by the reaction of a $(C_2$—$C_3)$-alkylene oxide or sulfide with an amine of the formula:

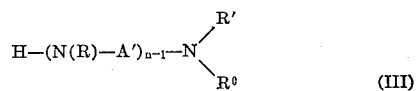
(III)

In the Formulas II and III, the symbols are the same as those defined in Formula I.

Preferred copolymers are those of about 1% to 10% by weight of one of the compounds of Formula I with at least one ester of an acid of the formula

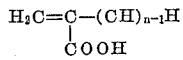

in which n is an integer having a value of 1 to 2 with an alcohol having from 1 to 8 carbon atoms such as methanol, ethanol, propanol, butanol, cyclohexanol, and 2-ethylhexanol.

I claim:
1. As a composition of matter, a copolymer of about ½ to 20% by weight of a polyamine of the formula

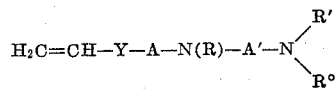

wherein

Y is selected from the group consisting of O and S,
A is an alkylene group having 2 to 4 carbon atoms,
A' is an alkylene group having 2 to 3 carbon atoms,
R is selected from the group consisting of H and $(C_1$—$C_4)$-alkyl, and
R' and R⁰ are individually selected from the group consisting of H and $(C_1$—$C_6)$-alkyl, at least one other monomer selected from the group consisting of esters of acrylic acid and methacrylic acid with a $(C_1$—$C_{18})$-alcohol selected from the group consisting of saturated aliphatic, saturated alicylic, and aralkyl alcohols, vinyl esters of a saturated $(C_1$—$C_4)$-aliphatic carboxylic acid, and vinylaromatic hydrocarbons, 0 to 70% by weight of at least one compound selected from the group consisting of acrylonitrile, methacrylonitrile, vinyl chloride, and vinylidene chloride, 0 to 10% by weight of at least one other monomer having a polar group selected from the group consisting of amine, amide, and hydroxyl groups, and 0 to 2% by weight of an α,β-monoethylenically unsaturated carboxylic acid, said polymer imparting improved adhesive characteristics to coating or impregnating compositions containing it.

2. A copolymer of about ½ to 20% by weght of a polyamine of the formula defined in claim 1 with about 80 to 99.5% by weight of at least one ester of an acid of the formula

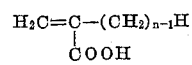

in which n is an integer having a value of 1 to 2, with a saturated alcohol having 1 to 8 carbon atoms, said polymer imparting improved adhesive characteristics to coating or impregnating compositions containing it.

3. A copolymer of about ½ to 20% by weight of a polyamine of the formula defined in claim 1, up to 70% by weight of a monomer selected from the group consisting of acrylonitrile, methacrylonitrile, vinyl chloride, and vinylidene chloride, and the balance to make 100% by weight of at least one other monomer selected from the group consisting of esters of acrylic acid and methacrylic acid with a ($C_1$—$C_{18}$)-alcohol selected from the group consisting of saturated aliphatic, saturated alicyclic, and aralkyl alcohols, vinyl esters of a saturated ($C_1$—$C_4$)-aliphatic carboxylic acid, and vinylaromatic hydrocarbons, said polymer imparting improved adhesive characteristics to coating or impregnating compositions containing it.

4. A copolymer of about ½ to 20% by weight of a polyamine of the formula defined in claim 1, up to 70% by weight of a monomer selected from the group consisting of acrylonitrile, methacrylonitrile, vinyl chloride, and vinylidene chloride, about up to 10% by weight of at least one other monomer having a polar group selected from the group consisting of amine, amide, and hydroxyl groups, up to 2% by weight of an $\alpha,\beta$-monoethylenically unsaturated carboxylic acid, and the balance to make 100% by weight of at least one other monomer selected from the group consitsing of esters of acrylic acid and methacrylic acid with a ($C_1$—$C_{18}$)-alcohol selected from the group consisting of saturated aliphatic, saturated alicyclic, and aralkyl alcohols, vinyl esters of a saturated ($C_1$—$C_4$)-aliphatic carboxylic acid, and vinylaromatic hydrocarbons said polymer imparting improved adhesive characteristics to coating or impregnating compositions containing it.

References Cited by the Examiner

UNITED STATES PATENTS

| | | | |
|---|---|---|---|
| 2,871,203 | 1/1959 | Melamed | 260—80.5 |
| 2,897,200 | 7/1959 | Maeder | 260—86.1 |

FOREIGN PATENTS 838,020 6/1960 Great Britain.

JOSEPH L. SCHOFER, *Primary Examiner.*

W. HOOVER, *Assistant Examiner.*